United States Patent [19]
Banner et al.

[11] Patent Number: 5,470,025
[45] Date of Patent: Nov. 28, 1995

[54] METHOD AND APPARATUS FOR MONITORING AND CONTROLLING AN ARMATURE WINDING MACHINE INCLUDING MISSED TANG DETECTION

[75] Inventors: Alvin C. Banner, Kettering; Mark T. Heaton, Springfield, both of Ohio

[73] Assignee: Globe Products Inc., Huber Heights, Ohio

[21] Appl. No.: 254,480

[22] Filed: Jun. 6, 1994

Related U.S. Application Data

[63] Continuation of Ser. No. 773,335, Oct. 7, 1991, abandoned.

[51] Int. Cl.$^6$ ............................ H01B 11/04; H02K 15/04
[52] U.S. Cl. ............................ 242/7.03; 242/7.05 B; 29/598; 29/732
[58] Field of Search ............................ 242/7.02, 7.03, 242/7.05 R, 7.05 A, 7.05 B, 7.05 C; 29/596, 598, 732, 736

[56] References Cited

U.S. PATENT DOCUMENTS

| | | | |
|---|---|---|---|
| 3,713,598 | 1/1973 | Bucholtz et al. | 242/7.05 B |
| 3,973,738 | 8/1976 | Miller | 242/7.05 B |
| 4,459,742 | 7/1984 | Banner | 242/7.05 B X |
| 4,756,075 | 7/1988 | Dolgas | 29/598 X |
| 5,029,619 | 7/1991 | Hongo et al. | 140/92.2 |
| 5,053,656 | 10/1991 | Hodge | 29/598 X |
| 5,080,295 | 1/1992 | Hongo et al. | 242/7.05 R X |

FOREIGN PATENT DOCUMENTS

| | | |
|---|---|---|
| 0424770 | 10/1990 | European Pat. Off. . |
| 58-144061 | 8/1983 | Japan . |

OTHER PUBLICATIONS

Admitted Prior Art, "Additional Instructions", Dated Jul. 3, 1984 printed by Statomat–Globe, Inc., Dayton, Ohio.
Brochure "Exactrol–FM" published Nov. 1986 by Statomat–Globe, Inc., Dayton, Ohio, concerning Prior Art.

*Primary Examiner*—Daniel P. Stodola
*Assistant Examiner*—Michael R. Mansen
*Attorney, Agent, or Firm*—Roger S. Dybvig

[57] ABSTRACT

The operation of a flier-type armature winding machine is monitored to detect if a tang connection is missed and for interrupting the operation of the machine in such event. Differences in wire usage between those cases in which a tang connection is successfully made and those cases in which a tang connection is missed are detected and, if the differences are substantial, the operation of the armature winding machine is terminated. The monitoring is done with a shaft encoder and an add-subtract counter by which is computed the degrees of forward and reverse rotation of a guide pulley over or around which the wire is coursed. In a modification, up and down movements of a dancer pulley are monitored to provide an indication of wire usage.

22 Claims, 2 Drawing Sheets

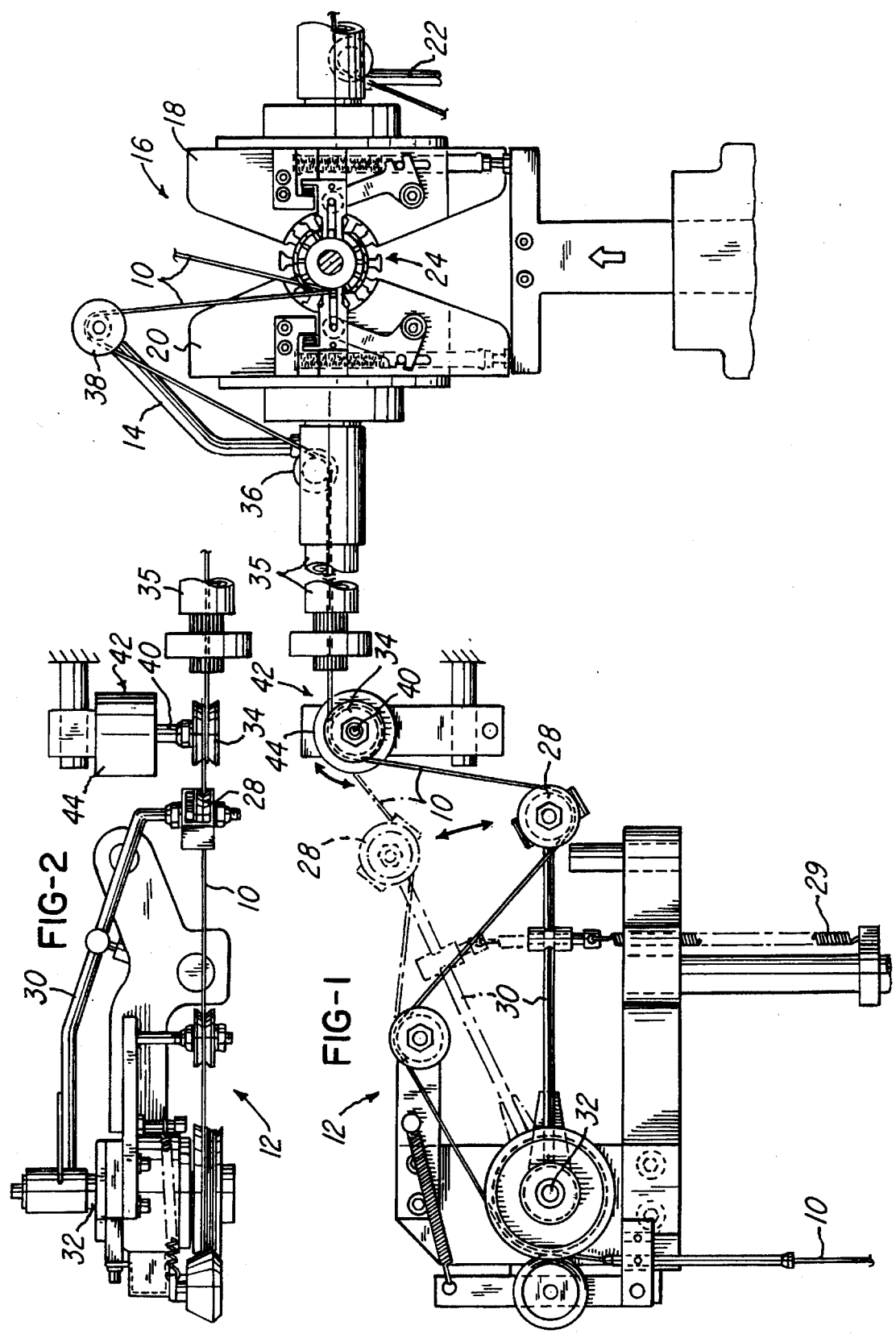

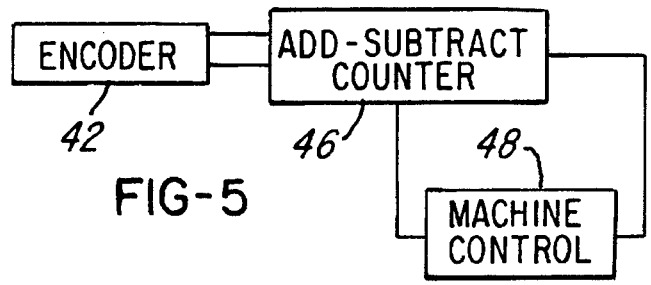
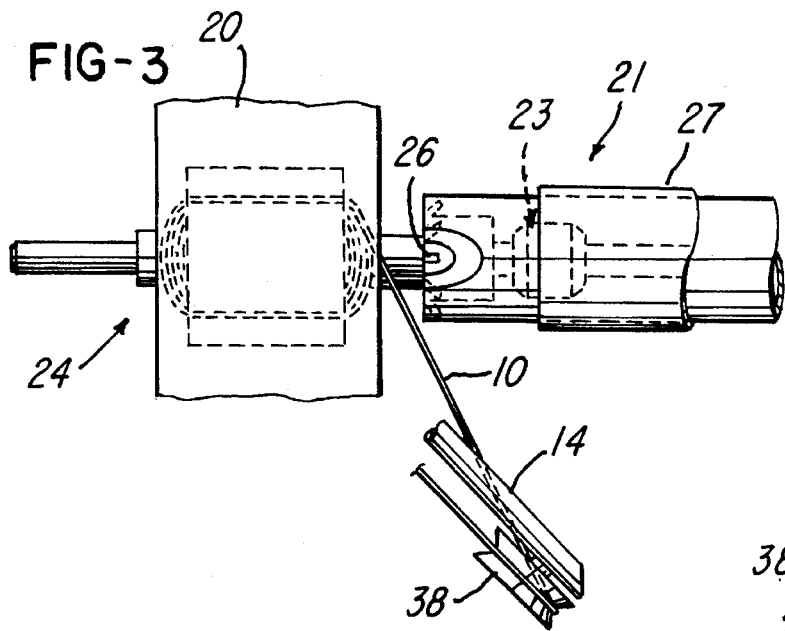
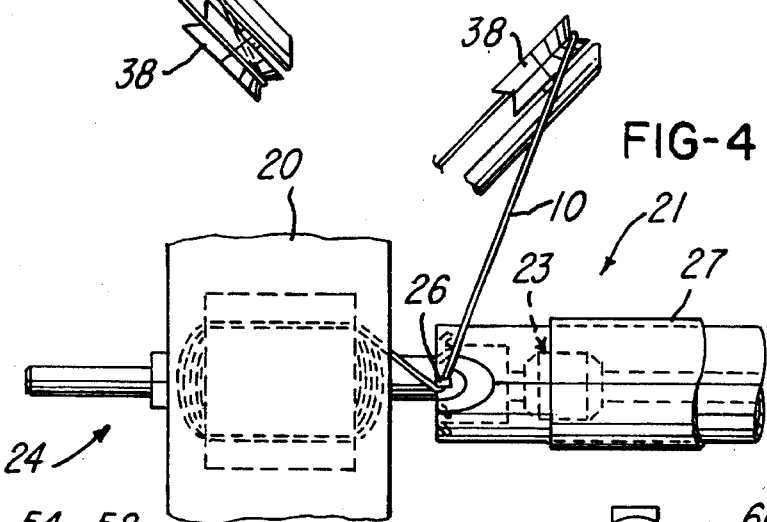
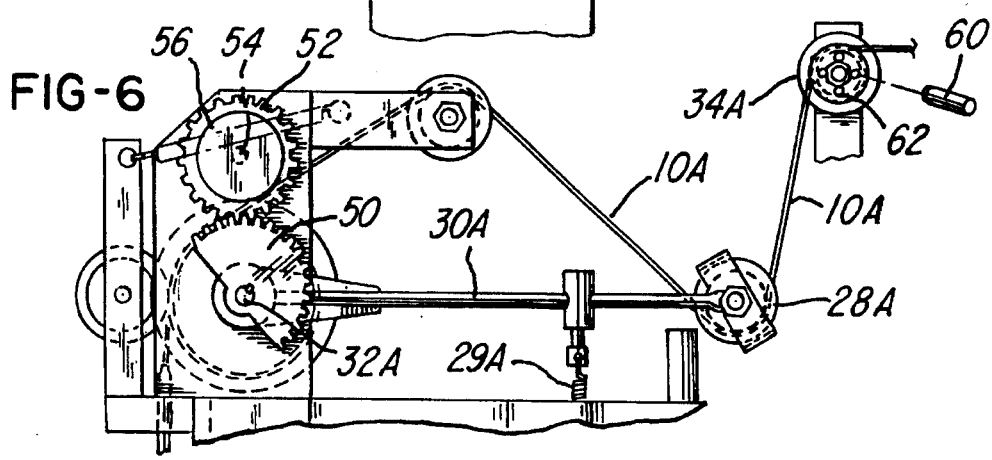

METHOD AND APPARATUS FOR MONITORING AND CONTROLLING AN ARMATURE WINDING MACHINE INCLUDING MISSED TANG DETECTION

This is a continuation of application Ser. No. 07/773,335 filed on Oct. 7, 1991, now abandoned.

SUMMARY OF THE INVENTION

This invention relates primarily to a method and apparatus for monitoring and controlling the operation of an armature winding machine including missed tang detection. In particular, this invention relates to a system for monitoring wire usage during predetermined intervals of a machine cycle. When winding armatures having commutator with wire lead-receiving hooks or tangs, the intervals of wire usage detection include the times when coil lead wires are connected to commutator tangs. In the event the monitored wire usage is outside a predetermined tolerance, machine operation is interrupted to enable an operator to determine the cause.

The invention is primarily intended for use in flier-type armature winding machines of the type disclosed, for example, in Jerry E. Miller U.S. Pat. No. 3,973,738, granted on Aug. 10, 1976, and Alvin C. Banner U.S. Pat. No. 4,459,742, granted on Jul. 17, 1984. However, those familiar with the wire winding art will recognize that the invention may have application in other wire winding machines or processes wherein it would be desirable to monitor wire usage and interrupt machine operation if the monitored wire usage is not within certain tolerances. An example would be a winding process in which armature coil lead wires are terminated or stuffed in commutator bar slots.

In a flier-type armature winding machine, magnet wire is drawn from a wire supply spool through a wire tensioning device, also called a "dereeler", through a hollow, rotatably-driven flier spindle into which it is guided by a guide pulley, then over a flier pulley located at the end of a flier arm that extends outwardly from the flier spindle, and to the armature core or commutator, as the case may be.

At the beginning of the winding of an armature, the free end of the wire extending from the flier pulley is held by a suitable clamp. When the flier rotates to wind a coil in a pair of armature core slots, the wire is under tension because it is drawn from the supply spool through the tensioning device. Connection of the coil lead wires to the commutator tangs is accomplished by appropriate movements of the flier and rotational movements of the armature core. At times there is a tendency of the wire between the armature and the tensioning mechanism to become slack. A slack wire condition is undesirable because slack wire can become unmanageable. Accordingly, a slack take-up device, usually associated with the tensioning mechanism, is provided to effectively pull the wire reversely through the flier spindle and thereby maintain it under tension. A common slack take-up device comprises a so-called dancer pulley so mounted and biased that it creates a longer wire path between the flier spindle and the tensioning mechanism when the wire tends to become slack. It is called a dancer pulley because it erratically moves rapidly up and down during the winding of an armature. Many armature winding machines have two or more fliers, each having associated supply spools, tensioning mechanisms and slack take-up mechanisms.

A particularly vexing problem encountered in connection with the use of flier-type armature winders for winding armatures having commutators with wire lead-receiving tangs is that a connection of a wire lead to the tang is occasionally missed. That is, there is a failure of a coil lead wire lead to be successfully connected to a commutator tang. Often the tang connection is missed due to a missing or mutilated tang, but tang connections may also be missed due to faulty machine operation. Sometimes a commutator connection may be made but the connection is so tenuous that it is lost during subsequent operations of the winding machine. This often occurs either during a tang shielding step or during the time when the flier has begun to wind the first turn of the next coil. For purposes of this invention, a commutator connection failed to made and a commutator connection made but subsequently lost before the next coil is fully wound are both considered to be a missed tang. When using prior armature winding machines, the winding process continues notwithstanding a missed tang, although the armature wound, and perhaps successively wound armatures, must later be discarded or else have wire removed therefrom and be passed again through a winding operation. Substantial lengths of wire have to be discarded and valuable production time is lost.

An object of one aspect of this invention is to provide a method and apparatus for monitoring the operation of an armature winding machine to detect if a commutator connection is missed and for interrupting the operation of the machine in such event. In this aspect of the invention, differences in wire usage between those cases in which a commutator connection is successfully made and those cases in which a commutator connection is missed are detected and, if the differences are substantial, the operation of the armature winding machine is terminated.

In the preferred practice of this invention, detection of the differences in wire usage at those times when tang connections are to be made is preferably accomplished by monitoring the rotational movements of a guide pulley over or around which the wire is coursed between the slack take-up mechanism and the flier spindle—the guide pulley that guides the wire into the flier spindle being ideally suited for this purpose. The monitoring of the rotation of the guide pulley is useful because it rotates in one direction (called the "forward" direction herein) when wire is being drawn from the supply spool through the flier spindle and in the opposite direction ("reverse" direction herein) when the slack take-up device draws wire rearwardly through the flier spindle. A common practice when connecting a lead wire to a commutator tang is to reversely rotate the flier from a stop position and create a slack condition which remains until after the lead wire is hooked over a tang, after which the continued reverse movement of the flier causes wire to be drawn from the supply spool. As a result, a guide pulley located between the slack take-up mechanism and the flier spindle rotates in the reverse direction during the initial reverse motion of the flier and, assuming a tang is hooked, the guide pulley will rotate in the forward direction as the flier nears the end of its reverse motion. If a tang connection is missed, the slack wire condition remains and the guide pulley continues to reversely rotate throughout the entire reverse motion of the flier. There may be cases in which the guide pulley will not behave in the manner described above, but it believed that in most if not all cases, there will be detectable differences in the degrees of guide pulley forward and reverse rotation which can be used to indicate whether or not a tang connection has been successfully made.

Preferably, the degrees of guide pulley rotation in both directions is monitored and the net rotation, that is, degrees of forward rotations less degrees of reverse rotation, is computed and compared with a net rotation known to be indicative of a successful tang connection. If the compared net rotations are substantially identical, within predetermined tolerance limits, operation of the machine continues. Otherwise, a signal is generated indicating that an improper machine function has occurred and the operation of the machine discontinued. There may be cases in which the degrees of pulley rotation in one direction need not be distinguished from the degrees of pulley rotation in the other direction. Thus, the degrees of rotation in both directions could be added together and compared with a predetermined sum. However, this will not often be useful or desirable because the total degrees of reverse and then forward rotation of the guide pulley when a tang connection is made may be the same or nearly the same as the total degrees of reverse rotation if the tang connection is missed. In such cases, a missed tang may go undetected by the monitoring apparatus because the rotation detected by the monitoring apparatus in the event of a missed tang may be within tolerance limits for a successful tang connection.

In advance of the machine operation, the electronic machine controls are placed in a "teaching" mode, as will be understood by those familiar with machine controls, and an armature is wound. At this time the forward and reverse rotations of the guide pulley are monitored during each interval of machine operation when a lead wire is connected to a commutator tang. Assuming the armature winding and lead wire connections are satisfactorily accomplished, there will be placed in the machine memory a table of net degrees of forward and reverse rotation of the guide pulley during each interval of operation in which a lead wire is connected to a commutator tang. The machine controls are then placed in a "comparison" mode so that, during subsequent production winding of armatures, each time a tang connection is to be made, the monitored degrees of guide pulley rotation is compared with the table in the machine memory and, if the monitored net degrees of guide pulley rotation is within a predetermined tolerance limit, say 15 per cent, from that in the table, the machine operation continues. If not, a signal is initiated to terminate operation of the winding machine.

Here it may be noted that the monitoring of wire usage is known in the armature winding art but, insofar as known, the monitoring devices sensed only (1) relatively large amounts of wire usage during intervals in which a wound armature is removed from the armature winding machine and replaced by an unwound armature, when there should be no wire usage at all, (2) a substantial lack of wire usage when coils of wire are being wound resulting from an interruption in the supply of wire to a flier, typically resulting from the wire being broken, when there should be a substantial wire usage, and (3) a substantial excess of wire usage when coils of wire are being wound as would result if a armature core lamination were displaced and blocked entry of wire into a coil-receiving slot, causing a coil to be wound partly on the outside surface of the armature core. Such a monitoring device monitored the rotation of a guide pulley by means of a proximity detector which produced an electrical signal for each 90 degrees of rotation of the guide pulley. Electronic means added the number of signals generated by the proximity detector during the winding of each coil and compared that number with a table of signals previously placed in the machine memory. If, during the winding of a coil, the number of signals was unusually low, as would result from a discontinuance of rotation of the guide pulley due to wire breakage, or unusually high, as would result from a coil being wound partly around the outside of an armature core, the operation of the machine was interrupted. If rotation of the guide pulley were detected during the time a wound armature is removed from the winder and replaced by an unwound armature, indicating that wire was being drawn from the wire source, as would be caused if there were a failure to cut the wound armature free from the wire source, operation of the machine would be interrupted for that reason. The prior monitoring devices were incapable of detecting the direction of rotation of the guide pulley or of detecting less than 90 degrees of rotation. Such a device will be further described below in connection with FIG. 6.

A further object of this invention is to provide a method and apparatus for monitoring the operation of an armature winding machine in which a single monitor is used to enable the monitoring of commutator connections, as provided by this invention, and also to enable the monitoring of machine operations at other intervals of machine operation to stop operation of the machine if a wire is not cut free from a wound armature being removed from the winding machine or to stop machine operation if either too little or too much wire is used to wind a coil. As is evident, tables of net guide pulley rotation can be placed in memory for all of the involved intervals of machine operation and comparisons made to the tables to terminate operation of the machine whenever the monitored net degrees of guide pulley rotation differ from the table for any particular operating interval.

Further in accordance with this invention, an armature winding machine is provided with a shaft encoder consisting of a stationary portion fixed to the bed or frame of the machine and a rotating portion on which the guide pulley between the tensioning system is fixed. The shaft encoder is one which is highly sensitive in terms of an ability to provide a very high count of output signals for each 360 degree rotation of the guide pulley. An add-subtract counter is operated by the shaft encoder to add a count for each signal generated in a forward direction of wire feed and subtract a count for each signal generated when the guide pulley is rotated in a reverse direction by the dancer pulley. When winding commutators having tangs, during proper tang hooking while the flier is moving in the reverse direction, the wire initially goes slack as it leaves the normal stop position, then is pulled forwardly after a tang is hooked and until the flier reaches its reverse stop position. If a hook is missed, slack occurs throughout the reverse movement and this is monitored by the system and method disclosed herein.

In a modification, the up and down movements of the dancer pulley are monitored for the intervals during which machine operation is being monitored, and compared with a table of movements placed in the machine memory. Monitoring movements of the dancer pulley can be accomplished by using a shaft encoder having a rotating shaft upon which a dancer arm supporting the dancer pulley is mounted.

Other objects and advantages will become apparent from the following description in which reference is made to the accompanying drawings.

BRIEF DESCRIPTION OF THE DRAWINGS

FIG. 1 is a fragmentary side elevational view of a portion of a wire tensioning system and a monitoring system supplying wire to the flier of an armature winding machine.

FIG. 2 is a fragmentary plan view taken looking down on the left end portion of FIG. 1.

FIG. 3 is a fragmentary elevational showing a coil wound into slots of an armature core and the flier at its normal stop position preparatory to moving in reverse to hook a tang.

FIG. 4 is a fragmentary view similar to FIG. 3, with the flier having completed its reverse direction rotation and arriving at a reverse stop position.

FIG. 5 is a highly simplified block diagram of a control system for monitoring and interrupting machine operation in the event the length of wire monitored is outside of normal tolerances.

FIG. 6 is fragmentary elevational view similar to FIG. 1 but showing an alternate embodiment.

DESCRIPTION OF THE PREFERRED EMBODIMENT(S)

FIG. 1 illustrates magnet wire 10 being fed upwardly from the lower left hand side of that figure through a tensioning mechanism 12 and then through a hollow, rotatably-driven, hollow flier spindle 35 into which it is guided by a guide pulley 34, around a spindle-exit pulley 36 and over a flier pulley 38 at the outer end of a flier 14 of a double flier armature winding machine 16. Armature winding machine 16 may be entirely conventional except for the monitoring and control apparatus described below. The armature winding machine 16 includes a second flier 22 and a pair of winding forms 18 and 20, one for each flier.

An armature 24 has its cylindrical laminated core positioned within cylindrical recesses in the winding forms 18 and 20. The armature 24 is indexed to present different pairs of slots in the core to the fliers 14 and 22 so as to enable winding of a first pair of coils within the slots and after winding, stopping the rotation of the fliers, indexing the armature with a motor driven armature rotator or indexing device 21, which is only partly shown in the drawings, to different positions for enabling wire to be wound in other pairs of slots. Armature rotator 21 has an armature shaft-gripping collet 23 for holding the armature while it is being wound. Each flier 14 and 22 typically has a normal "forward" direction of rotation when winding coils, a normal forward stop position, as shown for flier 14 in FIG. 3, a reverse direction of rotation for hooking coil lead wires to commutator tangs, and a reverse stop position shown in FIG. 4. In preparation for the hooking of a commutator tang, the armature may be rotatably indexed and an outer commutator shield 27 is moved to expose the tang to be hooked, as described in the above mentioned Miller '738 and Banner '742 patents. In addition, a wire guide assembly, generally designated 25, that includes wire guide fingers 25A, is actuated to cause the wire segment leading from the flier to be coursed over the tang exposed by retraction of the outer shield 27. Wire guides of this type are well known and are shown in Glen E. Bucholtz et al U.S. Pat. No. 3,713,598 granted on Jan. 30, 1973.

During the first portion of reverse rotation from the position of flier 14 shown in FIG. 3 to the position shown in FIG. 4, tension on the wire 10 is reduced and slack wire results. If the commutator tang 26 exposed by retraction of the outer shield 27 is properly hooked by the wire 10 as shown in FIG. 4, the slack is removed and additional wire is pulled from the wire source as the flier completes its movement to its reverse stop position.

When slack wire occurs as a result of initial reverse rotation of the flier 14, a dancer pulley 28 rotatably mounted on a dancer arm 30 pivotally connected to the tensioning mechanism 12 by a shaft 32 and biased downwardly by a spring 29 connected to the arm 30 descends downwardly to a low position, such as the solid line position shown in FIG. 1. When the wire 10 is under tension, the dancer pulley 28 hovers at a level above the full line position thereof shown in FIG. 1. (The phantom line position of the dancer pulley 28 shown in FIG. 1 is a position it may occupy during periods when the wire is under high tension.) Downward movement of the dancer pulley 28 in effect pulls the slack wire reversely over the guide pulley 34, causing it to rotate reversely to its direction of rotation when wire is being pulled from the wire source. The path of the wire 10 from the supply area at the bottom left of FIG. 1 to the flier 14 can be followed around a plurality of pulleys including the dancer pulley 28 and guide pulley 34, only those latter two being significant for purposes of explanation of this invention.

The parts and operations as thus far described are entirely conventional. In accordance with this invention, the guide pulley 34 is mounted on an encoder shaft 40 which comprises a rotating portion of a shaft encoder 42 having a stationary body 44 (FIG. 2) fixed in relation to the bed or frame of the machine. A satisfactory encoder is an optical shaft encoder marketed by BEI Motions Systems Company, Industrial Encoder Division, Godela, Calif., Model H25E-SS-450-ABZC-8830-SM18. This particular encoder provides 1800 discreet signals in 360 degrees of rotation of encoder shaft 40. Therefore, very small degrees of rotation of the guide pulley 34 in either direction can be monitored. As is usually done, there are several wraps of wire around pulley 34, providing for positive traction force between the wire and the pulley 34 as the wire moves forwardly or reversely.

To illustrate a technique of determining whether wire has been properly hooked over commutator tang 26, the system can be made to function as follows. An add-subtract counter 46 (FIG. 5) is reset to predetermined start point when the flier 14 reaches the normal stop position of FIG. 3. This occurs before the first coil is wound and recurs after each coil is completed and a tang is to be hooked prior to winding the next coil.

While flier 14 moves in the reverse direction by approximately 70 degrees, wire 10 goes slack, the dancer pulley 28 is pulled downwardly by the dancer arm spring 29, and guide pulley 34 is caused to reversely rotate by virtue of the positive reverse pull on wire 10. Shaft encoder 42 distinguishes that the direction is in reverse and the add/subtract counter 46 subtracts a count for each signal picked up by rotation of shaft 40. Let us assume that 50 "negative" signals are counted.

Then, when a tang 26 has been hooked, wire 10 feeds forwardly under tension, causing the dancer pulley 28 to move upwardly, and guide pulley 34 is driven forwardly (clockwise as viewed in FIG. 1) by the sections of wire 10 passing thereover being drawn from the wire source through the tensioning mechanism 12. This adds "positive" counts into the add/subtract counter 46. When the flier 14 reaches its reverse stop position shown in FIG. 4, the count of the add/subtract counter 46 is electronically checked and compared with the count of the add/subtract counter 46 previously determined for the same interval of machine operation for an armature in which all tang connections are successfully accomplished. If, in this example, the wire moving in the forward direction causes the positive count to also equal 50 in the event of a properly hooked tang, the counter 46 will be at or quite near to its originally set starting point when the flier reaches the reverse stop position. This is exemplary only, since the counts change for each armature design, and for each tang connection operation, and may actually differ, either plus or minus, from the starting point after the flier reaches the FIG. 4 position.

At this time, a check can be made to determine whether the tang has been hooked properly. Comparison between the readout from the counter 46 can be made electronically with a predetermined algebraic sum which is a number indicative of the length of wire fed if the hooking was made as intended. In practice, if the algebraic sum of the forward and reverse motions of the encoder shaft 40 as provided to counter 46 is within a predetermined tolerance, which may be determined by trial and error, for example, plus or minus 15 per cent of such predetermined algebraic sum, conditions are indicative that the machine operation should continue. If, however, the sum provided by the add-subtract counter 46 is outside the tolerance range, the machine controls terminates operation of the machine so that corrective action can be taken.

Those familiar with double flier armature winding machines will be aware that there will be two tensioning mechanisms 12 and two shaft encoders 42, one for each flier 14 and 22. The mechanisms associated with the flier 22 will operate in the same manner as the corresponding mechanisms associated with the flier 14 and are not described herein.

Preferably, the wire feed is monitored not only to provide an indication of a properly hooked tang, but also to monitor a situation in which a tang is hooked at the outset, but for some reason, becomes unhooked as winding the next coil is initiated. This can occur if the tip of a faulty tang catches the wire, and, as the outer sleeve 27 is advanced toward the armature core to trap the wire on the tang, the sleeve 27 pushes the wire off the tip of the tang. Another occasion for removal of wire in the event of a faulty tang connection occurs when the flier begins to rotate to wind the next coil and exerts a maximum pull on the hooked portion of the wire. In either case, the loss of a tang connection will result in a slack wire condition with a consequent change in degree of guide pulley rotation from the norm established in the memory of the machine control system. The encoder continually senses any guide pulley and the counter 46 continually computes the algebraic sum of positive and negative pulses representative, respectively, of the forward and reverse rotations of the guide pulley 34, the counter can be reset to a starting point just prior to the flier reverse rotation undertaken to hook a coil lead wire about a tang and the net sum of the signals counted thereafter by the counter 46 can be checked at any one or all of the following intervals: 1) when the flier reaches its reverse stop position; 2) after the outer sleeve 27 is extended toward the armature; or 3) after the flier begins to rotate to wind the next coil. Different intervals could be checked, such as after the next indexing movement of the armature and before the commencement of the winding of the next coil. Thus it is apparent that both missed tangs and unhooked tangs can be detected using the method and apparatus of this invention.

Referring now to the block diagram of FIG. 5, the shaft encoder generates signals which are input into the add-subtract counter 46 in a manner well known in the encoder art. Each signal generated will be added in the case of rotation of the guide pulley 34 in a forward direction in response to the drawing action of the flier 14 on the wire 10, and will subtract a count for each signal derived when the guide pulley 34 rotates in a reverse direction or counter-clockwise as viewed in FIG. 1. A machine control 48 is shown as being responsive to the add-subtract counter 46 for enabling the machine to continue operation if wire feed is within a specified tolerance range, or to interrupt machine operation in the event the wire feed is outside tolerance.

Other functions in any wire winding machine can be monitored, providing that both forward and reverse wire movements can be finely sensed with an encoding system. In addition, other monitoring systems can be made to operate in accordance with the method. For example, in the modification shown in FIG. 6, a gear segment 50 fixed to a dancer arm shaft 32A oscillates in response to the up and down motion of a dancer arm 30A biased downwardly by a spring 29A. Gear segment 50 is shown meshed with a driven gear 52 affixed on the shaft 54 of an encoder 56 mounted on a fixed member (not shown) so as to be held stationary. The operation of the embodiment of FIG. 6 is deemed apparent from the foregoing. Whereas in the embodiment of FIGS. 1 through 5 the shaft encoder 42 detected forward and reverse rotation of the guide pulley 34, the shaft encoder 54 of FIG. 6 detects the upward and downward movements of the dancer pulley 28A or, more precisely, the rotational movements of the dancer arm 30A resulting therefrom.

As will be evident, the shaft encoders and counters of this invention can be used at other intervals of machine operation to detect for wire breakage. Such can be done by resetting the counter to a starting point at the beginning of the winding of each coil and comparing the count at the end of the winding of each coil with the count table entry for the same interval of operation of the machine lodged in memory during the successful winding of an armature at an earlier time. So too can the shaft encoders and counters of this invention be used to detect when wire is being drawn from the wire source during the intervals in which a wound armature is being removed from the machine and replaced by an unwound armature. The counter 46 is reset to a starting point just before the wound armature is removed and the encoder signals added by the add/subtract counter 46 are compared with a table in the machine memory of known correct values when an unwound armature is loaded into and gripped by the collet 23.

Although the apparatus of FIG. 6 as thus far discussed can be used to accomplish the functions described above, another, prior art, sensing system is illustrated therein that was and may be used to detect for broken wires or excess wire usage during the winding of coils and also for for wire being pulled from the supply source when a wound armature is being removed from the machine. This prior art sensing system comprises a proximity detector 60 located adjacent the guide pulley 34A which guides the magnet wire 10A into the flier spindle (not shown in FIG. 6) that senses the rotation of four small metallic plates 62 located at 90 degree spaced locations about the periphery of the pulley 34A. The proximity detector is insensitive to the direction of pulley rotation. A counter (not shown) adds the number of signals received from the proximity detector and compares that sum with a previously prepared table placed in the machine memory. The prior art system is useful for its purpose but is not useful for missed tang detection because it senses only relatively large degrees of rotation of the guide pulley and it is insensitive to the direction of pulley rotation.

Various other changes may be made in the details of construction without departing from the spirit and scope of the claims.

Having described our invention, we claim:

1. A method for monitoring the operation of a cyclical machine which utilizes wire in the winding of electric motor components and interrupting the operation of the machine in the event of faulty winding operation, said machine having a winding member that pulls wire from a source of wire under tension over a guide pulley during some intervals of operation and permits the wire to become slack during other intervals of operation, the wire being pulled from said winding member by operation of a slack take-up mechanism when the wire becomes slack, said method comprising the steps of:

sensing increments of rotation of said guide pulley in a first direction as wire is being drawn from said source;

sensing increments of rotation of said guide pulley in a reverse direction when operation of said winding member results in a slack wire condition;

computing an algebraic sum of the increments of rotation of said guide pulley both in said first and in said reverse direction which is equal to the difference between the increments of rotation of said guide pulley in said first direction and the increments of rotation of said guide pulley in said reverse direction;

determining whether said algebraic sum is within a predetermined tolerance limit of a predetermined algebraic sum of increments of rotation of said guide pulley for a given cyclical portion of machine operation; and interrupting operation of the machine if said algebraic sum is outside of said tolerance limit.

2. The method of claim 1 wherein said electric motor component is an armature having a laminated core, a segmented commutator, and a shaft on which said core and said commutator are mounted, wherein said winding member is moved to connect the wire to the commutator at spaced intervals of time during the operation of said machine, and wherein said computed algebraic sum is computed during the intervals of machine operation including the times when said winding member is moved to connect a wire to said commutator.

3. The method of claim 2 wherein said winding member is a flier of a flier-type winding machine and said computed algebraic sum is computed during an interval of time when said flier is rotated from one position to another position to connect the wire to said commutator.

4. The method of claim 1 wherein said electric motor component is an armature having a laminated core, a segmented commutator, and a shaft on which said core and said commutator are mounted, said commutator having a tang on each commutator segment, wherein said winding member is moved to hook the wire to different ones of said commutator tangs at, respectively, different spaced intervals of time during the operation of said machine, and wherein said computed algebraic sum is computed during the intervals of machine operation comprising the times when said winding member is moved to hook the wire over said commutator tangs.

5. The method of claim 4 wherein said winding member is a flier of a flier-type winding machine which is rotated from one position to another at spaced intervals of time to hook the wire to one of said commutator tangs and said computed algebraic sum is computed during said intervals of time when said flier is rotated from one position to another position to hook the wire to said commutator tangs.

6. The method of claim 4 wherein said winding member is a flier of a flier-type winding machine which is rotated from one position to another at spaced intervals of time to hook the wire to one of said commutator tangs and rotated during intermediate intervals of time to wind armature coils, and said computed algebraic sum is computed during an interval of time that commences when said flier begins to rotate from one position to another position to hook the wire to one of said commutator tangs and ends when said flier subsequently rotates to begin the winding of the next one of said armature coils to be wound.

7. The method of claim 6 wherein said machine includes a commutator shield movable to cover and uncover a given commutator tang and wherein said computed algebraic sum is computed at times during the operation of said machine such that the determination as to whether said computed algebraic sum is within a predetermined tolerance limit of said predetermined algebraic sum, indicates, if outside said tolerance limit, either a failure to hook the wire to said given tang by rotation of said flier or an unhooking of wire from a hooked tang as said shield is moved to shield said given tang.

8. The method of claim 6 wherein said computed algebraic sum is computed at times during the operation of said machine such that the determination as to whether said computed algebraic sum is within a predetermined tolerance limit of said predetermined algebraic sum, indicates, if outside said tolerance limit, either a failure to hook a tang during the rotation of said flier or an unhooking of wire from a hooked tang as the winding of the next coil to be wound is initiated.

9. In an armature winding machine including a) a flier having a primary forward rotation coil winding direction, a normal stop position, a reverse direction for hooking wire around a commutator tang of a motor armature between winding of successive coils and a reverse stop position, b) a wire tensioning system located along a path of wire feed from a wire supply to said flier, c) a wire slack take-up device located between said wire supply and said flier, and d) a control system for interrupting machine operation in the event wire usage within a predetermined portion of a machine cycle does not meet a norm of wire usage during that cycle, the improvement comprising:

a guide pulley intermediate said wire slack take-up device and said flier, said guide pulley having wire trained thereover so as to be positively rotated in a forward direction in response to wire being drawn by said flier and positively rotated in a reverse direction in response to wire being drawn by said wire slack take-up device when slack is created in said wire between said flier and said wire supply;

a shaft encoder comprising a stationary body and a rotatable shaft mounting said guide pulley and coaxial therewith, and means for sensing angular displacement of said shaft relative to said body, said guide pulley being affixed to said encoder shaft so that said encoder shaft rotates with said guide pulley;

an add-subtract counter that receives signals from said shaft encoder and in response to said signals adds counts when wire is fed in said forward direction by said flier and subtracts counts when said wire is fed in said reverse direction by said wire slack take-up device; and means for interrupting machine operation in the event a total output count of said shaft encoder is outside a predetermined tolerance for said predetermined portion of a machine cycle.

10. The apparatus of claim 9 wherein wire is wrapped about at least 360 degrees of said guide pulley.

11. The apparatus of claim 9 wherein said means for interrupting machine operation is operable when said flier initiates movement in a coil-winding direction for winding the next coil.

12. The apparatus of claim 9 wherein said means for interrupting machine operation is operable when said flier reaches said reverse stop position.

13. The apparatus of claim 9 further comprising a movable tang shield that is moved into covering relation to a tang after it is hooked, and wherein said means for interrupting machine operation is operable when said shield is so moved.

14. The apparatus of claim 9 wherein said wire slack take-up device comprises a rotatable shaft, a dancer arm mounted on said shaft, a dancer pulley rotatably mounted on said dancer arm, said wire being trained over said dancer pulley, and means biasing said dancer arm to rotate about the axis of said shaft in a direction to take up slack in the wire.

15. In an armature winding machine including a) a flier having a primary forward rotation coil winding direction, a normal stop position, a reverse direction for hooking wire around a commutator tang of a motor armature between winding of successive coils and a reverse stop position, b) a wire tensioning system located along a path of wire feed from a wire supply to said flier, c) a wire slack take-up device having a wire slack take-up pulley, said wire slack take-up device having a shaft biased in a wire slack take-up direction, said wire slack take-up pulley being located between said wire supply and said flier and said wire being trained over said wire slack take-up pulley, d) a guide pulley in the wire path between said wire slack take-up pulley and said flier, said wire being trained over said guide pulley, and e) a control system for interrupting machine operation in the event wire usage within a given portion of a machine cycle does not meet a norm of wire usage during that cycle, the improvement wherein said control system comprises:

a shaft encoder comprising a stationary body and a rotatable shaft, and means for sensing angular displacement of said shaft relative to said body, said shaft being operatively associated with one of said pulleys so as to rotate in response to movements thereof;

an add-subtract counter that receives signals from said shaft encoder and in response to said signals adds counts when wire is fed in said forward direction by said flier and subtracts counts when said wire is fed in said reverse direction by said wire slack take-up device; and means for interrupting machine operation in the event a total output count of said shaft encoder is outside a predetermined tolerance for said given portion of a machine cycle.

16. The apparatus of claim 15 wherein said guide pulley is mounted on said shaft.

17. The apparatus of claim 15 wherein said wire slack take-up pulley comprises a dancer pulley mounted on a dancer arm and said dancer arm is mounted on said shaft.

18. The apparatus of claim 15 wherein said wire slack take-up device comprises a rotatable shaft, a dancer arm mounted on said shaft, a dancer pulley rotatably mounted on said dancer arm, said wire being trained over said dancer pulley, and means biasing said dancer arm to rotate about the axis of said shaft in a direction to take up slack in the wire.

19. A method for monitoring the operation of a cyclical machine which utilizes wire in the winding of electric motor components and interrupting the operation of the machine in the event of faulty winding operation, said machine having a winding member that pulls wire from a source of wire under tension over a guide pulley during some intervals of operation and permits the wire to become slack during other intervals of operation, the wire being pulled from said winding member when the wire becomes slack by operation of a wire slack take-up device with which the wire is engaged, said method comprising the steps of:

sensing increments of movements of said wire slack take-up device in a first direction as wire is being drawn from said source;

sensing increments of movements of said wire slack take-up device in a reverse direction when operation of said winding member results in a slack wire condition;

computing an algebraic sum of the increments of movements of said wire slack take-up device both in said first and in said reverse direction;

determining whether said algebraic sum is within a predetermined tolerance limit of a predetermined algebraic sum of increments of movements of said wire slack take-up device for a given cyclical portion of machine operation; and interrupting operation of the machine if said algebraic sum is outside of said tolerance limit.

20. A method for monitoring the operation of a cyclical machine which utilizes wire in the winding of electric motor components and interrupting the operation of the machine in the event of faulty winding operation, said machine having a winding member that pulls wire from a source of wire under tension over a guide pulley during some intervals of operation and permits the wire to become slack during other intervals of operation, the wire being pulled from said winding member when the wire becomes slack by operation of a wire slack take-up device having a wire slack take-up pulley over which the wire is trained, said method comprising the steps of:

sensing increments of movements of one of said pulleys in a first direction of movement thereof as wire is being drawn from said source;

sensing increments of movements of said one of said pulleys in a reverse direction when operation of said winding member results in a slack wire condition;

computing an algebraic sum of the increments of movements of said one of said pulleys both in said first and in said reverse direction which is equal to the difference between the increments of movements of said one of said pulleys in said first direction and the increments of movements of said one of said pulleys in said reverse direction;

determining whether said algebraic sum is within a predetermined tolerance limit of a predetermined algebraic sum of increments of movements of said one of said pulleys for a given cyclical portion of machine operation; and interrupting operation of the machine if said algebraic sum is outside of said tolerance limit.

21. The method of claim 20 wherein said wire guide pulley is mounted on a rotatable shaft, wherein said one of said pulleys comprises said guide pulley, and wherein said sensing steps are accomplished by sensing rotational movements of said shaft.

22. The method of claim 20 wherein said wire slack take-up device comprises a rotatable shaft, a dancer arm mounted on said shaft, and means biasing said dancer arm to rotate about the axis of said shaft in a direction to take up slack in the wire, said wire slack take-up pulley comprising a dancer pulley rotatably mounted on said dancer arm, wherein said one of said pulleys comprises said dancer pulley, and wherein said sensing steps are accomplished by sensing rotational movements of said shaft.

* * * * *